(12) United States Patent
Cianciotto et al.

(10) Patent No.: US 7,295,385 B2
(45) Date of Patent: Nov. 13, 2007

(54) VARIABLE, HOMOGENIZING OPTICAL SPLITTER APPARATUS AND METHOD

(75) Inventors: Frank T. P. Cianciotto, Tehachapi, CA (US); Bruce S. McDonell, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/507,312

(22) Filed: Aug. 21, 2006

(65) Prior Publication Data

US 2007/0081255 A1 Apr. 12, 2007

Related U.S. Application Data

(63) Continuation-in-part of application No. 11/126,974, filed on May 11, 2005, now Pat. No. 7,173,775.

(51) Int. Cl.
*G02B 27/10* (2006.01)
*G02B 17/00* (2006.01)

(52) U.S. Cl. .................. 359/726; 359/618; 362/551

(58) Field of Classification Search ........... 359/726, 359/727, 618, 627; 385/133, 146, 147; 362/551
See application file for complete search history.

(56) References Cited

U.S. PATENT DOCUMENTS 6,112,004 A 8/2000 Colvin
7,182,495 B2 * 2/2007 Cianciotto et al. .......... 362/551

OTHER PUBLICATIONS

Co-pending U.S. Appl. No. 10/744,922, filed Dec. 23, 2003.
Co-pending U.S. Appl. No. 10/857,073, filed May 28, 2004.
Co-pending U.S. Appl. No. 11/122,205, filed May 3, 2005.
Co-pending U.S. Appl. No. 11/154,079, filed Jun. 15, 2005.
Co-pending U.S. Appl. No. 11/180,285, filed Jul. 12, 2005.
Co-pending U.S. Appl. No. 11/199,826, filed Aug. 9, 2005.

* cited by examiner

*Primary Examiner*—Alicia M Harrington
(74) *Attorney, Agent, or Firm*—Harness, Dickey & Pierce, P.L.C.

(57) ABSTRACT

An apparatus and method for receiving a Gaussian profile optical input signal and splitting the input signal into two or more homogenized, top-hat profile output beams. In one embodiment first and second hexagonally shaped homogenizer tubes are coupled perpendicularly to one another. A beam splitting element is disposed within the second tube. A Gaussian profile input optical signal is directed into an input end of the first tube and reflects off highly reflective interior surfaces of the first tube as it propagates therethrough and impinges the beam splitting element. As it is split into two or more subcomponents by the beam splitting element, it continues reflecting off of highly reflective interior surfaces of the second tube until each of the output beams reaches a respective output end of the second tube. The apparatus accomplishes redirecting, splitting and transforming a Gaussian profile input optical signal into a desired plurality of homogenized, top-hat profile output signals in a compact configuration that is highly optically efficient.

20 Claims, 9 Drawing Sheets

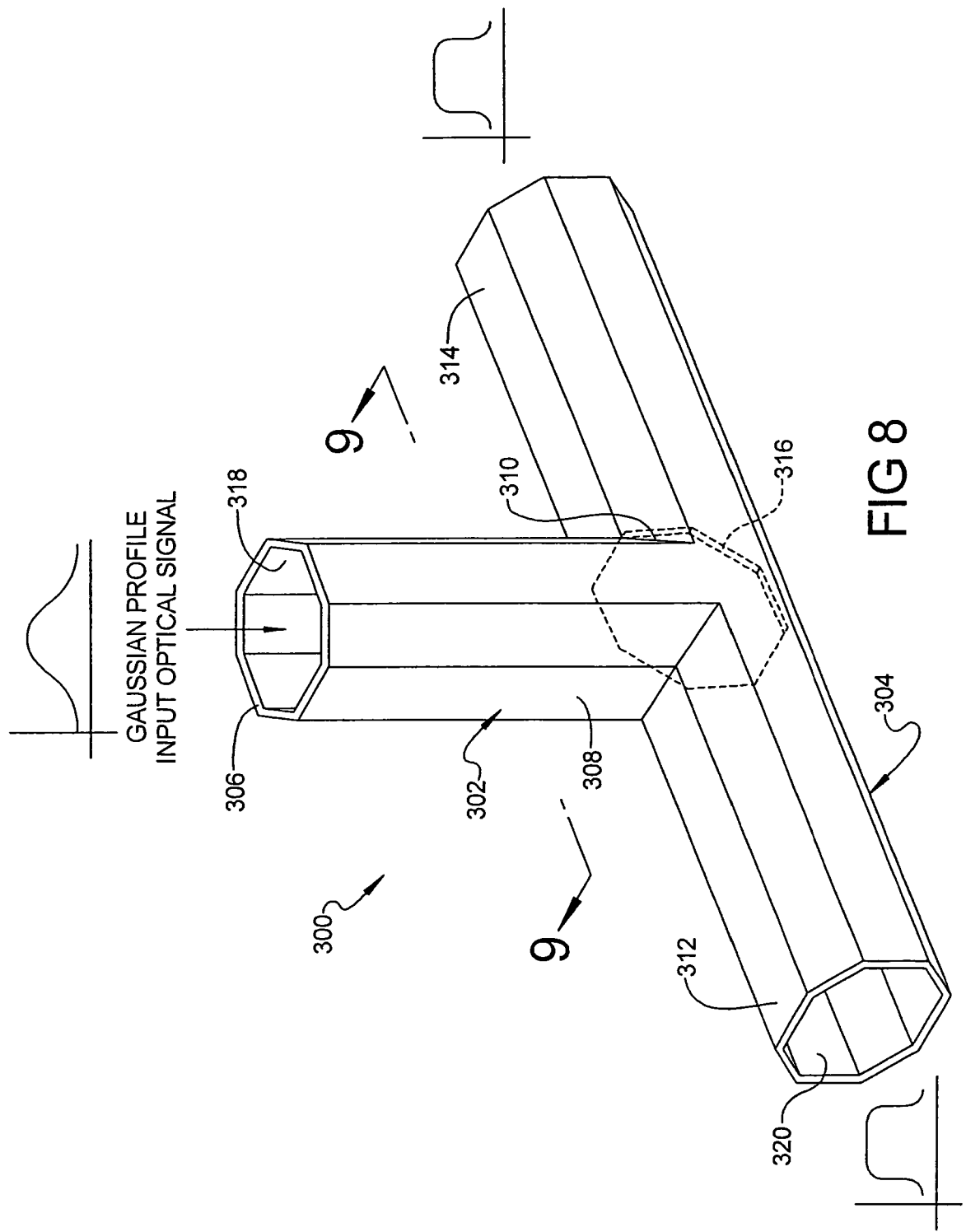

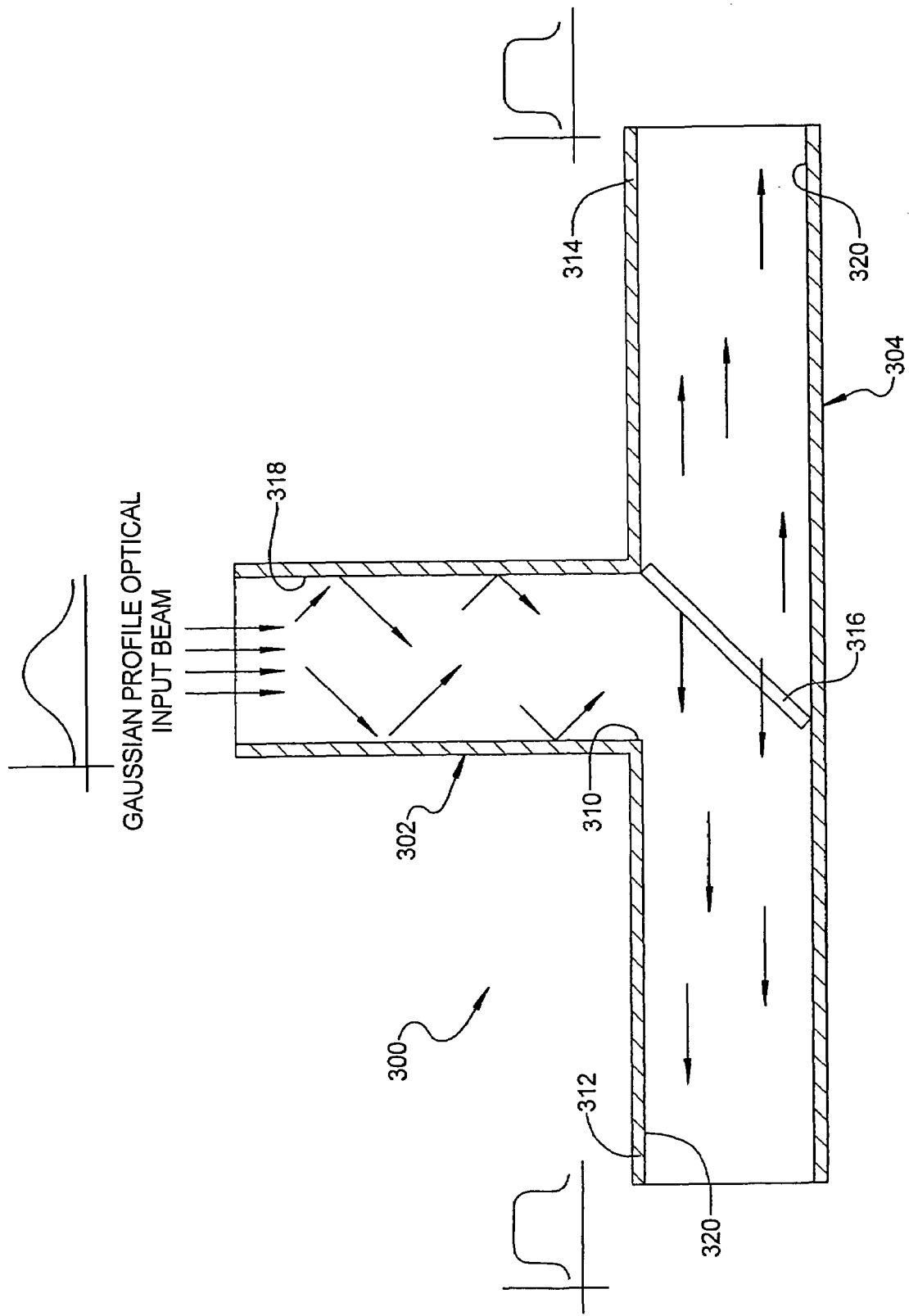

VARIABLE, HOMOGENIZING OPTICAL SPLITTER APPARATUS AND METHOD

CROSS-REFERENCE TO RELATED APPLICATIONS

This application is a continuation-in-part application of U.S. Ser. No. 11/126,974, entitled "Light Mixing Homogenizer Apparatus and Method", filed May 11, 2005 now U.S. Pat. No. 7,173,775 and presently pending, and which is hereby incorporated by reference into the present application.

FIELD

The present disclosure relates to optical systems, and more particularly to an optical signal splitting system that is able to receive a Gaussian optical input signal and to generate a pair of homogenized, top-hat profile optical output signals therefrom.

BACKGROUND

Optical systems often employ some form of signal splitter to split an input signal into two or more optical output signals. However, an optical signal that is required to receive a Gaussian profile input beam and to generate top-hat profile output beams therefrom has traditionally required a plurality of optical components that tend to make such signal splitting devices somewhat fragile, often heavy and of generally complex construction. Often such systems rely on glass optics for assisting in creating the homogenous, top-hat profile output beams. Such present day signal splitting systems are also often susceptible to contamination from dirt or oils that may exist in the environment in which the device is being used.

Accordingly, a need exists for an apparatus that is able to generate two or more homogenous, top-hat profile optical output beams from a Gaussian profile optical input beam, in a manner that does not involve the need for a large number of independent component parts or a construction design that is susceptible to contamination.

SUMMARY

The present disclosure relates to a homogenizing, optical splitter apparatus and method that is able to receive a Gaussian profile input optical signal, and to split the input signal into two or more homogenized, top-hat profile output signals.

In one form, a signal splitting apparatus is provided that involves the use of the first light guide component for receiving a Gaussian profile optical input signal. A second light guide component is in communication with an output of the first light guide component. A beam splitter is operably associated with the second light guide component. The Gaussian profile optical input signal input into the first light guide component is split by the beam splitter which causes a pair of homogenized, top-hat profile output signals to be produced at a pair of output ends of the second light guide component. In one form, the first light guide component comprises a tube having a hexagonal cross-sectional shape with a reflective coating on its interior surface. In one embodiment the second light guide component comprises a tube having a hexagonal cross-sectional shape. In one embodiment, an output end of the first light guide component is physically coupled over an opening at an intermediate point along a length of the second light guide component, and the beam splitter is located within the second light guide component adjacent the opening therein. The beam splitter can be selected such that a predetermined amount of optical energy can be directed to each end of the second light guide component.

A significant advantage of the system and method of the present disclosure is that an apparatus is provided that is highly resistant to contamination, and is of robust construction, and is able to convert a single Gaussian profile input beam into a pair of homogenized, top-hat profile output beams each having a predetermined sub quantity of the total optical energy provided by the input beam. The apparatus is scalable such that two, three, or virtually any plurality of homogenized, top-hat profile output beams can be generated from a single Gaussian profile input beam.

The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein:

FIG. 8 is a perspective view of a homogenizing, optical splitter apparatus in accordance with one embodiment of the present disclosure;

FIG. 9 is a cross sectional side view of the apparatus of FIG. 8 illustrating the flow of optical energy through the apparatus;

DETAILED DESCRIPTION

The following description of the various embodiment(s) is merely exemplary in nature and is in no way intended to limit the present disclosure, its application, or uses.

To provide a more thorough understanding of the operation of the various exemplary embodiments of the present disclosure, a discussion of the operation of the homogenizer tube used with the various embodiments will be provided first. The homogenizer tube is disclosed in U.S. patent application Ser. No. 10/744,922, filed Dec. 23, 2003, and incorporated by reference into the present application.

Figure 1A:
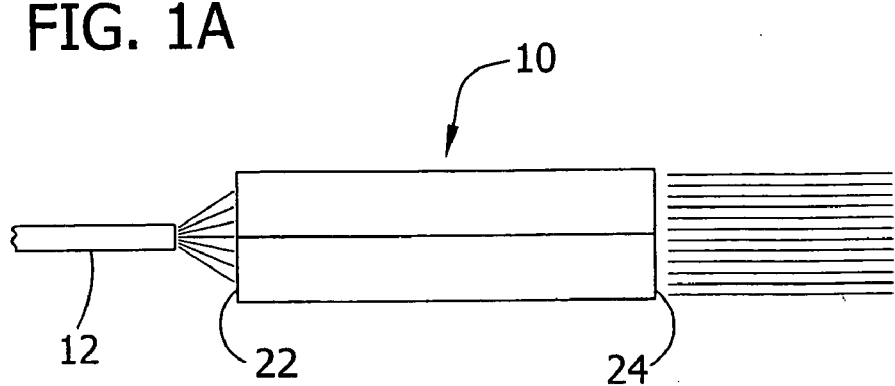
FIG. 1a is a side view of a light source entering a homogenizer tube used with a light mixing system of the present disclosure.
Figure 1B:
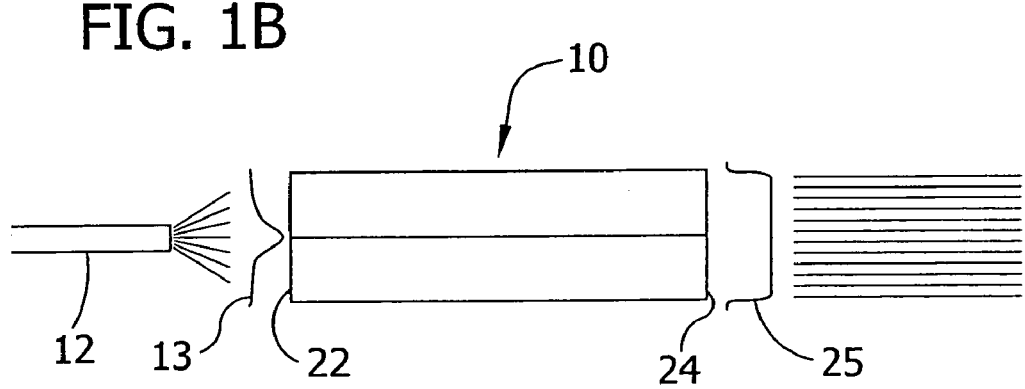
FIG. 1b is a side view of the homogenizer tube of FIG. 1 and also showing a light source as a "Gaussian" profile light beam and the light beam as a "top hat" profile output beam.

Referring to FIGS. 1a and 1b, the homogenizer tube is illustrated. The homogenizer tube 10 forms a hexagonal cross-sectional shaped tube that receives internally from a light source 12 such as a single optical fiber.

The hexagonal cross-sectional tube 10 is formed within an internal highly reflective surface 14 of hexagonal cross-section, preferably formed of gold or silver which forms a first metallic layer 16 having the reflective surface 14. In order to support the relatively thin metallic layer 16 a second metallic layer 18 is provided. This second metallic layer is preferably formed of nickel since it is cheaper than gold or silver and can provide the needed support structure for the relatively thin first layer 16.

Figure 2:
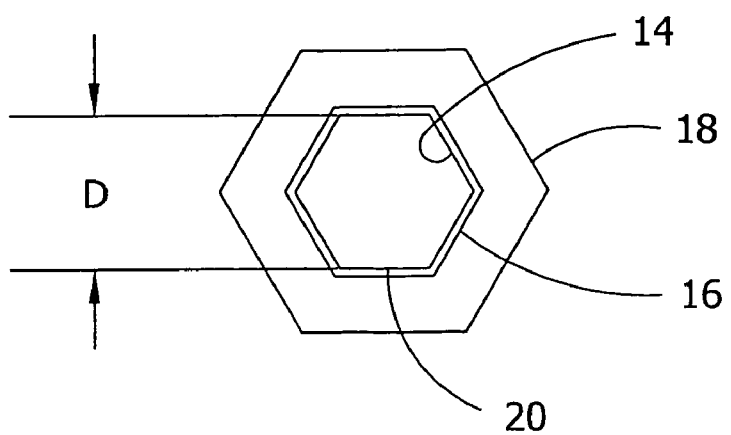
FIG. 2 is a cross-sectional view of a mandrel with multiple layers of metallic coating.

In order to fabricate the hexagonal cross-section tube 10 forming the light homogenizer, a mandrel 20 is utilized (see FIG. 2). Mandrel 20 is preferably made of aluminum and given a surface finish appropriate to produce the desired reflectivity on the internal surface of the tube, as discussed below. The first metallic layer 16 is applied to the mandrel 20 through any of several known techniques such as electroforming. Electroforming is essentially a process of plating the mandrel 20 with a layer of gold or silver to form the layer 16 and then further plating with a layer of nickel to form the outer support member or second metallic surface 18. The aluminum mandrel 20 is then removed from the interior surface 14 by melting, chemically etching, or exploiting differences in thermal coefficients of expansion between the electroformed parts and the mandrel. For example, in the present case, the aluminum mandrel 20 is coated with silver or gold to form the layer 16 and then coated to form the second layer of nickel 18. The aluminum mandrel is then preferably chemically dissolved leaving the nickel hexagonal tube with a highly reflective interior surface of gold or silver. However, other suitable materials may be utilized without departing from the scope of the present disclosure.

Figure 3:
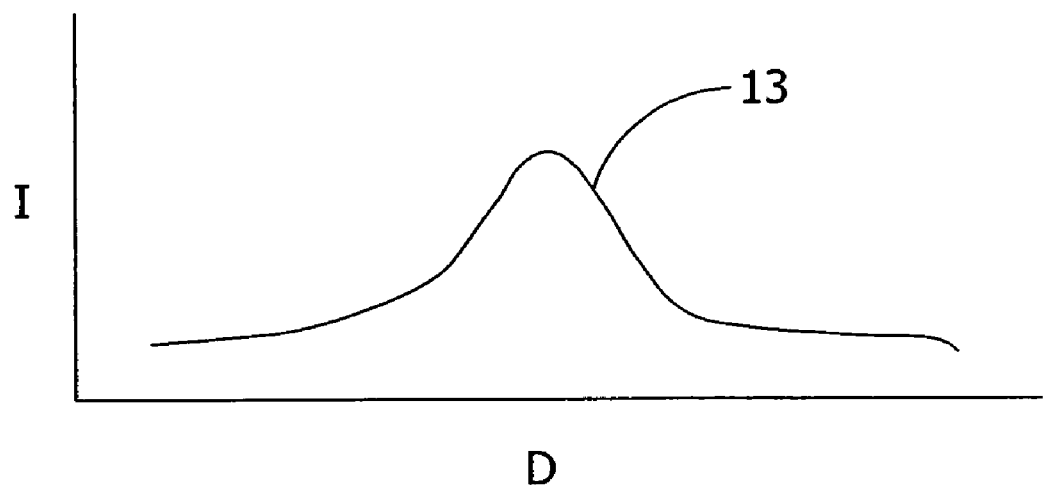
FIG. 3 shows an example of a Gaussian distribution profile from a light source such as that shown in FIG. 1.
Figure 4:
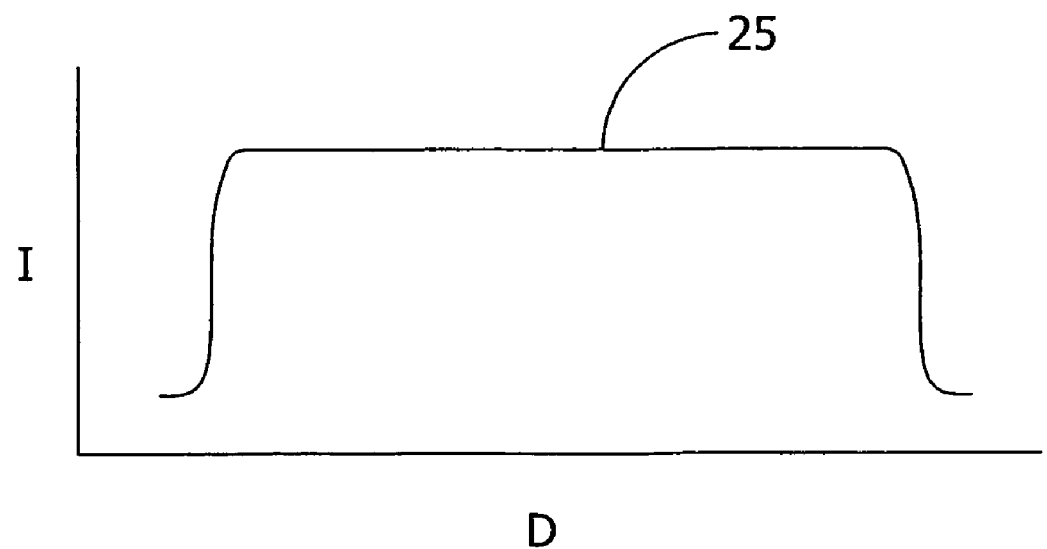
FIG. 4 shows a top hat profile of homogenized light output from the tube of FIG. 1.

The first layer of metallic coating 16 with the internal highly reflective surface 14 is formed of gold or silver or some other selected material which can maximize the performance of the hexagonal tube for specific light spectrums based on the reflectivity of the material, which selection process is well known to those skilled in the art. By the use of this highly reflective internal surface 14, the hex tube is capable of transforming a single fiber optic light output from the Gaussian shape 13 shown in FIGS. 1b and 3 to the top hat profile 25 shown in FIGS. 1b and 4 as an output from the homogenizer tube 10. In FIGS. 3 and 4, the graph shows an exemplary pattern of light intensity (i) versus the distance (D) across the fiber or from land-to-land in the tube 10 as shown as D in FIG. 2. FIG. 1b pictorially shows the "Gaussian" input and "top hat" (homogenous) output.

FIG. 3 is exemplary of the light intensity from a single optic fiber output where the light intensity profile varies across the diameter of the fiber. As shown in FIG. 3, the higher intensity light is in the center of the fiber and decreases near the outer edges of the fiber. When light from the optic fiber 12 enters the end 22 of tube 10 with the profile of FIG. 3 and is reflected from the surfaces of the hexagonal cross-sectional tube 10, it is transformed at the output end 24 of the tube to the top hat pattern of FIG. 4 where the intensity is essentially uniform across the span of the tube from land-to-land. In addition, the relatively small diameter of the light beam coming from a single fiber optic, such as for example, 0.020 inch (0.5 mm) diameter as it exits the optic fiber 12 is transformed in the tube to 0.240 inches (6 mm) from land-to-land at the exit and 24 of tube 10. To achieve this example, a hexagonal tube 10 having an internal light reflective surface having an internal transverse dimension of 0.254 inch (6.35 mm) from flat to opposite flat and a length of 1.016 inch (25.4 mm) was utilized.

The internal length to width (flat-to-flat) dimensions of tube 10 are preferably such that the length is approximately four to five times the internal width of tube 10. This length to width ratio is preferable since a smaller ratio may not allow enough "bounce" of the light to adequately homogenize it before it exits the tube, and a substantially larger ratio would allow too much "bounce" of the light which would reduce the energy level of the light at the output of the tube 10. However, other ratios may be used without departing from the scope of the present disclosure.

The surface smoothness of the highly light reflective internal surface 14 can vary substantially depending upon the purpose for which the present system is being utilized. However, in one preferred embodiment where the internal highly light reflective surface is silver, the optical smoothness of the surface is preferably in the range of $\lambda/2$ to $\lambda/6$ and more preferably about $\lambda/4$. This is particularly useful where the wave length of the light from the light source is in the visible to near infrared range of approximately 400 to 780 nanometers. This same surface smoothness range is also appropriate for establishing the highly reflective surface for many uses of the present disclosure so long as the reflectivity of the surface is preferably about at least 99 percent. It is envisioned that other optical smoothness and surface reflectivity could be used with the embodiments of the present disclosure.

The thickness of the internal layer of reflective material can vary as desired so long as it is adequately thick to provide the highly light reflective surface described above. The tube 10 could be formed of a single material so long as it is thick enough to be self supporting. However, for cost reasons, the thickness of the first layer 16, particularly when formed of gold or silver, should be relatively thin (for example, about 0.0001 to 0.0002 inches thick). The second layer 18 should be relatively thick, for example, about 0.010 inch to 0.020 inch thick). Thicknesses different from the foregoing examples do not depart from the scope of the present disclosure.

Figure 5:
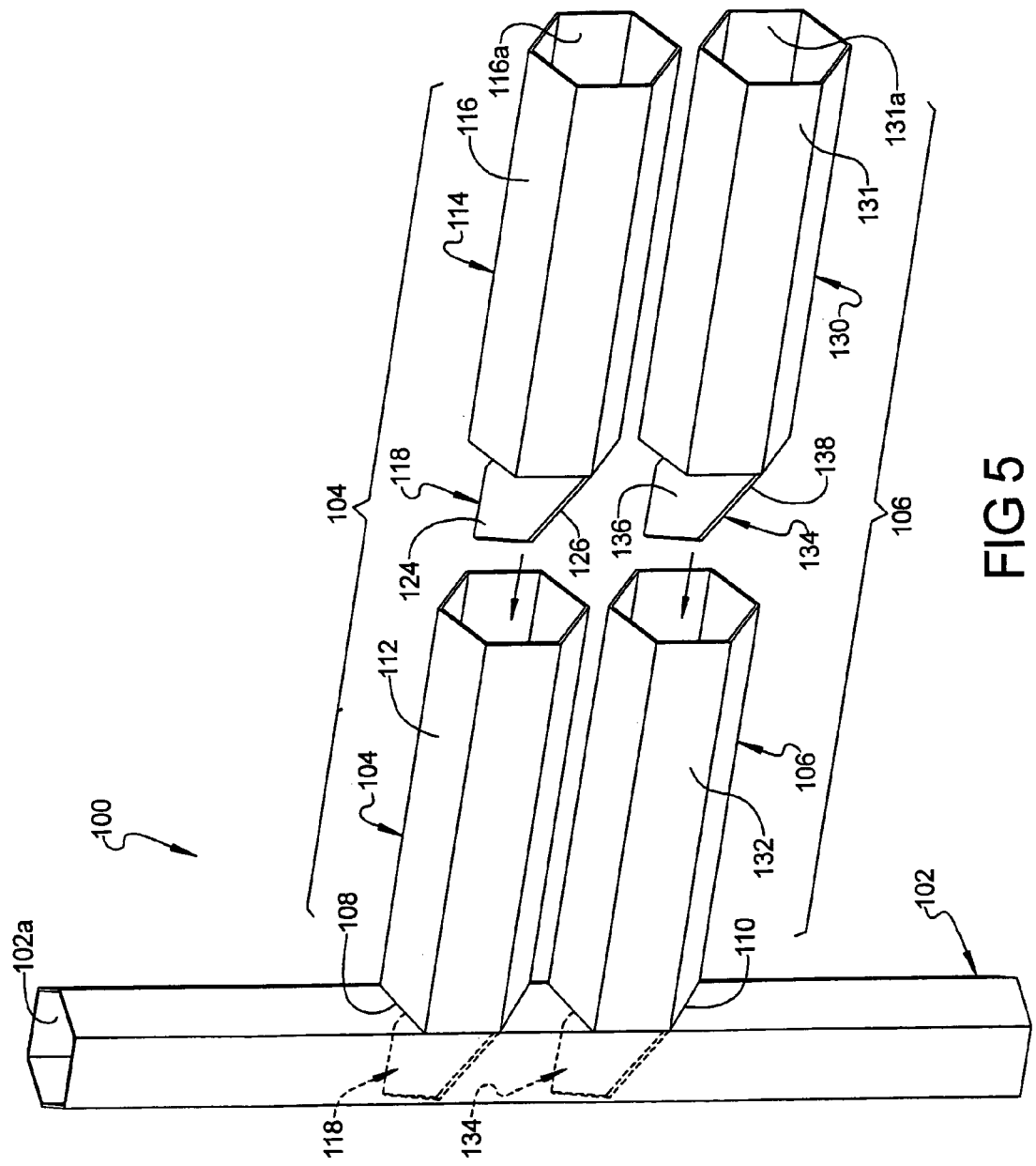
FIG. 5 illustrates a light mixing apparatus in accordance with one preferred embodiment of the present disclosure.

Referring now to FIG. 5, an apparatus 100 in accordance with one preferred embodiment of the present disclosure is shown. Apparatus 10 includes a first homogenizer tube 102, a second homogenizer tube 104, and a third homogenizer tube 106. The second and third homogenizer tubes 104, 106 are interfaced to hex-shaped openings 108 and 110 formed in the first homogenizer tube 102. Homogenizer tubes 104 and 106 are coupled to extend perpendicularly from first homogenizer tube 102. The second and third homogenizer tubes 104 and 106 are identical in construction. First homogenizer tube 102 also includes a reflective coating 102a on its interior wall.

Figure 5A:
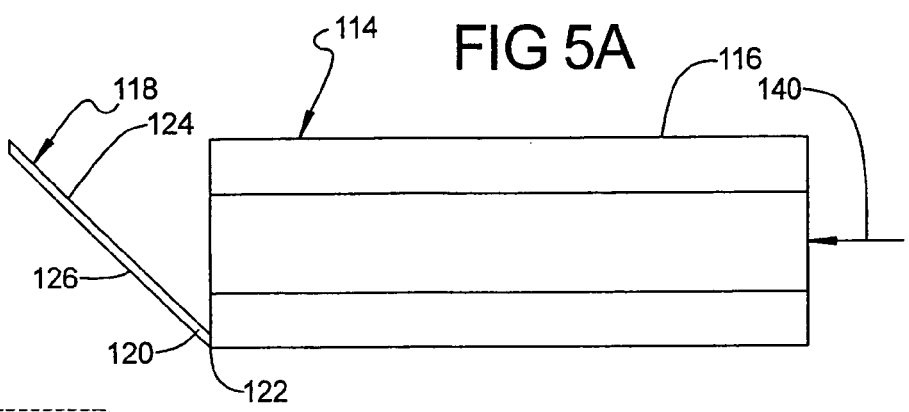
FIG. 5a is a side view of the tubular subassembly shown in FIG. 5.

With brief reference to FIGS. 5 and 5a, homogenizer tube 104 comprises an outer tubular portion 112 that is hexagonally shaped when viewed from an end thereof. One end of outer tubular portion 112 is fixedly secured to the first homogenizer tube 102. Within the hexagonally shaped tubular portion 112 is disposed a tubular homogenizer subassembly 114. The tubular homogenizer subassembly 114 is shown in FIG. 5a as well. The tubular subassembly 114 also is hexagonally shaped in crossed-section and includes a tubular portion 116 and an optical element 118. Optical element 118 is fixedly secured at one edge 120, such as by adhesives or mechanical means, to an edge 122 of the tubular portion 116. The optical element 118 has a first surface having a reflective coating 124 and a second (i.e., opposite) surface having a transmissive coating 126. Thus, an input light beam directed into the tubular portion 116, as indicated by arrow 128 in FIGS. 5 and 5a, is reflected off of the reflective surface 124 of the optical element 118 and directed at an angle of about 90° from its initial propagation path. However, a light beam directed at the transmissive surface 126 of the optical element 118 passes unimpeded through the optical element. The interior of the tubular portion 116 is also coated with a reflective material 116a as described in connection with FIGS. 1-2. With further reference to FIG. 5, the third homogenizer tube 106 includes a tubular homogenizer subassembly 130 that is constructed identically to tubular homogenizer subassembly 114. A reflective coating 131a is applied to the interior wall of a tubular portion 131. Tubular homogenizer subassembly 130 fits within an outer tubular, hexagonally shaped portion 132 of the third homogenizer tube 106 and includes an optical element 134 identical in construction to optical element 118, with a reflective surface 136 and a transmissive surface 138.

Tubular homogenizer subassemblies 114, 130 can be secured within their respective tubular portions 112, 132 via an end cap (not shown) or an epoxy (or adhesive) applied to the outer surfaces of subassemblies 114, 130. If an end cap is used, the light source could be integrated into the construction of the end cap. Use of an end cap would also allow easier disassembly of the homogenizer subassemblies 114, 130. Whether using end caps or epoxies (or adhesives) to retain the homogenizer subassemblies 114, 130, the sliding "tube-within-a-tube" construction facilitates manufacture and assembly using an electroforming process in conjunction with small internal pieces.

With further reference to FIGS. 5 and 5a, the outer tubular portion 132 is fixedly secured to the first homogenizer tube 102 at opening 110. The outer tubular portions 112, 132 can each be secured to the homogenized tube 102 using a suitable adhesive (for example, cyanoacylate). Alternatively, the homogenizer tube 102 and outer tubular portions 112, 132 could be formed from a molding process as a single piece component.

Figure 6:
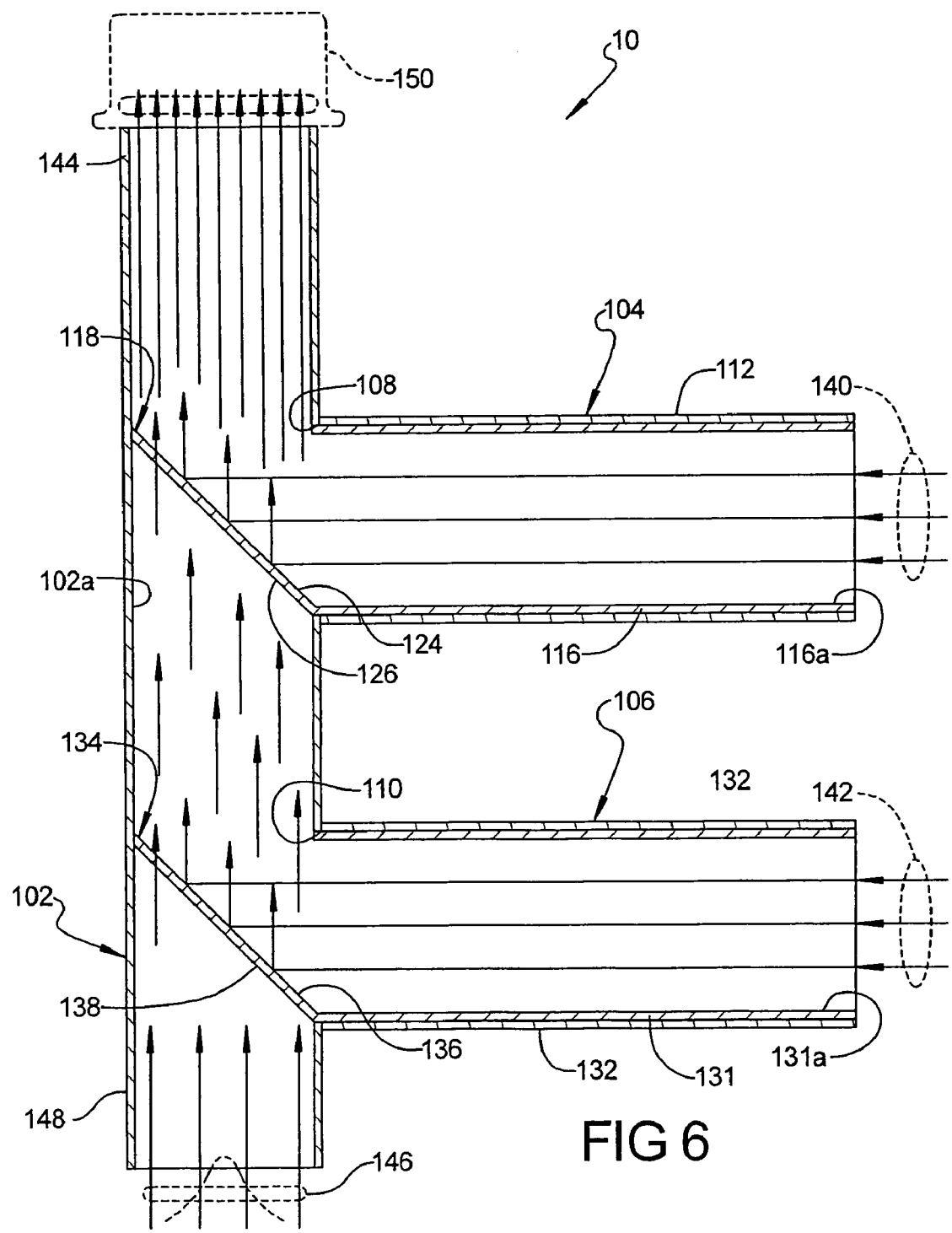
FIG. 6 is a side view of the apparatus of FIG. 5 revealing the optical components disposed within the tubular member and the manner in which the Gaussian profile input light beams are directed within the first tubular member.

Referring to FIG. 6, the operation of the apparatus 100 will now be described. Gaussian profile input light beams 140 and 142 are directed into the second and third homogenizer tubes 104 and 106, respectively. The light beams 140 and 142 are reflected off of optical elements 118 and 134 towards an output end 144 of first homogenizer tube 102. A Gaussian profile input light beam 146 is directed into an input end 148 of first homogenizer tube 102. The input light beam 146 passes through the optical elements 134 and 118 and mixes with the Gaussian profile input beams 140 and 142 prior to exiting the output end 144. The mixed light beams are effectively "summed" to provide a third, or output, light beam 150 having a top hat profile.

The apparatus 10 thus forms an efficient, relatively easy to construct means for mixing two or more Gaussian input light beams to form an output light beam having a desired color (i.e., wavelength). The output light beam has a wavelength that is the sum of the wavelengths of the input light beams. Accordingly, an output beam having a desired color can be generated simply by selecting two or more input beams having desired wavelengths that will sum to the desired output wavelength.

While three input light beams are illustrated in FIG. 6, it will be appreciated that a greater or lesser plurality of input light beams could be utilized and mixed to form an output beam having a desired color. Furthermore, the second and third homogenizer tubes 104 could be formed on different sides of the first homogenizer tube 102 (i.e., so as to be radially offset with one another, rather than radially aligned).

Figure 7:
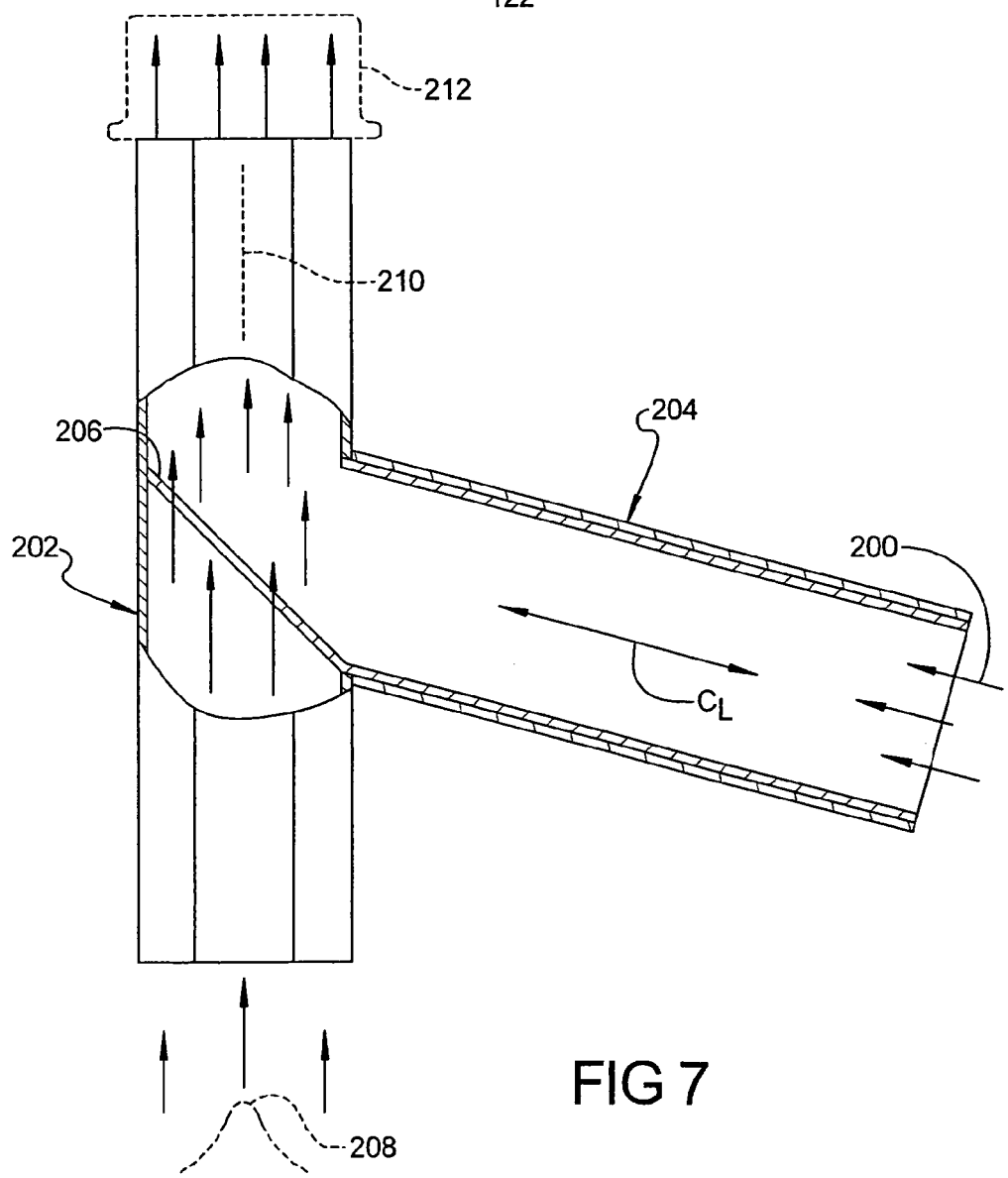
FIG. 7 is a view of an alternative embodiment illustrating a second homogenizer tube disposed non-perpendicular to a first homogenizer tube.

With brief reference to FIG. 7, an apparatus 200 in accordance with another embodiment of the present disclosure is shown. Apparatus 200 is similar to the apparatus 100 and is intended to illustrate that a second homogenizer tube 204 can be secured to a first homogenizer tube 202 at an angle that is non-perpendicular to the first homogenizer tube 202. Homogenizer tubes 202 and 204 are otherwise identical in construction to homogenizer tubes 104 and 106. Since homogenizer tube 204 is positioned non-perpendicular to tube 202, it will be appreciated that the optical element 206 associated with tube 204 will need to be positioned at an angle other than 45° relative to a longitudinal axis $C_L$ extending through tube 204 to thus be disposed at a 45° angle relative to a longitudinal axis 210 extending through tube 202. The optical element 206 reflects the input light beam 208 along the longitudinal axis 210 of the first homogenizer tube 202. The output light beam 212 also has a top hat profile.

Referring to FIG. 8, a homogenizing, optical signal splitter apparatus 300 is shown in accordance with one embodiment of the present disclosure. The apparatus 300 includes a first light guide member 302 in optical communication with a second light guide member 304. In one implementation, the first light guide member 302 comprises a first homogenizing tube, and will be referred to throughout the following discussion by this terminology. Similarly, in one implementation the second light guide element 304 comprises a second homogenizing tube, and will also be referred to throughout the following discussion by this terminology.

Homogenizing tube 302 includes an input end 306 and an output end 308. Homogenizing tube 304 includes an input portion forming an opening 310 at an intermediate point along the length thereof, and a pair of output ends 312 and 314. Within the second homogenizing tube 304 is positioned a beam splitter 316. Beam splitter 316 includes a portion that is reflective, that reflects a portion of an optical input signal that is input at input end 306 of the first homogenizing tube 302 to output end 312. The beam splitter 316 also includes a transmissive portion that enables a portion of the optical energy of the input beam to pass therethrough and be directed towards output end 314. The beam splitter 316, in one preferred form, comprises a Pellicle beam splitter commercially available from Newport Optics, Irvine, Calif. Pellicle beam splitters are ultra-thin, ultra-lightweight optical components that are coated for enabling a beam splitting function.

The beam splitter 316 can be used to tailor the optical output signals leaving each output end 312 and 314 of the homogenizing tube 304 such that a predetermined amount of energy from the input signal is selectively directed to each output end 312 and 314. For example, the beam splitter 316 can be manufactured such that 30% of the optical energy incident thereon is reflected to output end 312, while 70% is allowed to pass through the beam splitter 316 and be directed to output end 314. Thus, the total optical energy provided by the Gaussian optical input signal can be split as needed between the two output ends 312 and 314.

Referring further to FIG. 8, an interior surface 318 of the first homogenizer tube 302 forms a reflective surface, such as described for the interior surface of the tubular portion 116 shown in FIG. 5. Similarly, an interior surface 320 of the second homogenizer tube 304 forms a reflective surface, such as described in connection with homogenizer tube 102 shown in FIG. 5. The beam splitter 316 may be formed as an independent component and secured adjacent the opening 310 in the second homogenizer tube 304, as illustrated in FIG. 8. Alternatively, it may be formed as a portion that depends from a tubular assembly that is slid into homogenizer tube 302, such described with tubular portion 116 shown in FIG. 5.

Each of the first homogenizer tube 302 and the second homogenizer tube 304 have a hexagonal cross-sectional shape. Each of the homogenizing tubes 302 and 304 may be formed by a conventional electro-forming process. As will be appreciated, electro-forming is a process of fabricating a part from the plating itself. A shaped mandrel is plated sufficiently long to build up a stand alone thickness. The mandrel is then removed by melting, chemically etching or exploiting differences in thermal coefficients of expansion between the electroformed part and the mandrel. In one specific embodiment, each of the homogenizer tubes 302 and 304 may initially be formed with an aluminum "hex" mandrel that is coated with silver, and then coated with nickel. The aluminum mandrel is thereafter chemically melted away leaving a nickel, hexagonally shaped tube with a high reflective silver interior surface. Alternatively, the reflective interior surface 318, 320 may be formed from a gold plating. The thickness of the reflective layer of the interior surface may vary considerably, but is preferably between about 0.002 inch-0.003 inch (0.508 mm-0.0760 mm) in thickness. The exterior nickel surface is preferably between about 0.040 inch-0.065 inch (1 mm-1.5 mm), and more preferably about 0.002 inch (0.0508 mm) thick. The relationship of the length of each homogenizing tube 302, 304 to its respective length may also vary considerably, but in one preferred form a width-to-length ratio of about 1:6 is incorporated. A 1:6 width-to-length ratio provides a substantially uniform top-hat profile beam that may be uniform to within about 98% of a perfect top-hat profile. Such a width-to-length ratio also provides excellent efficiency for each homogenizing tube 302, 304, and enables the efficiency of each tube to approach, or even exceed, approximately 90% of the optical energy carried by the input signal.

Figure 10:
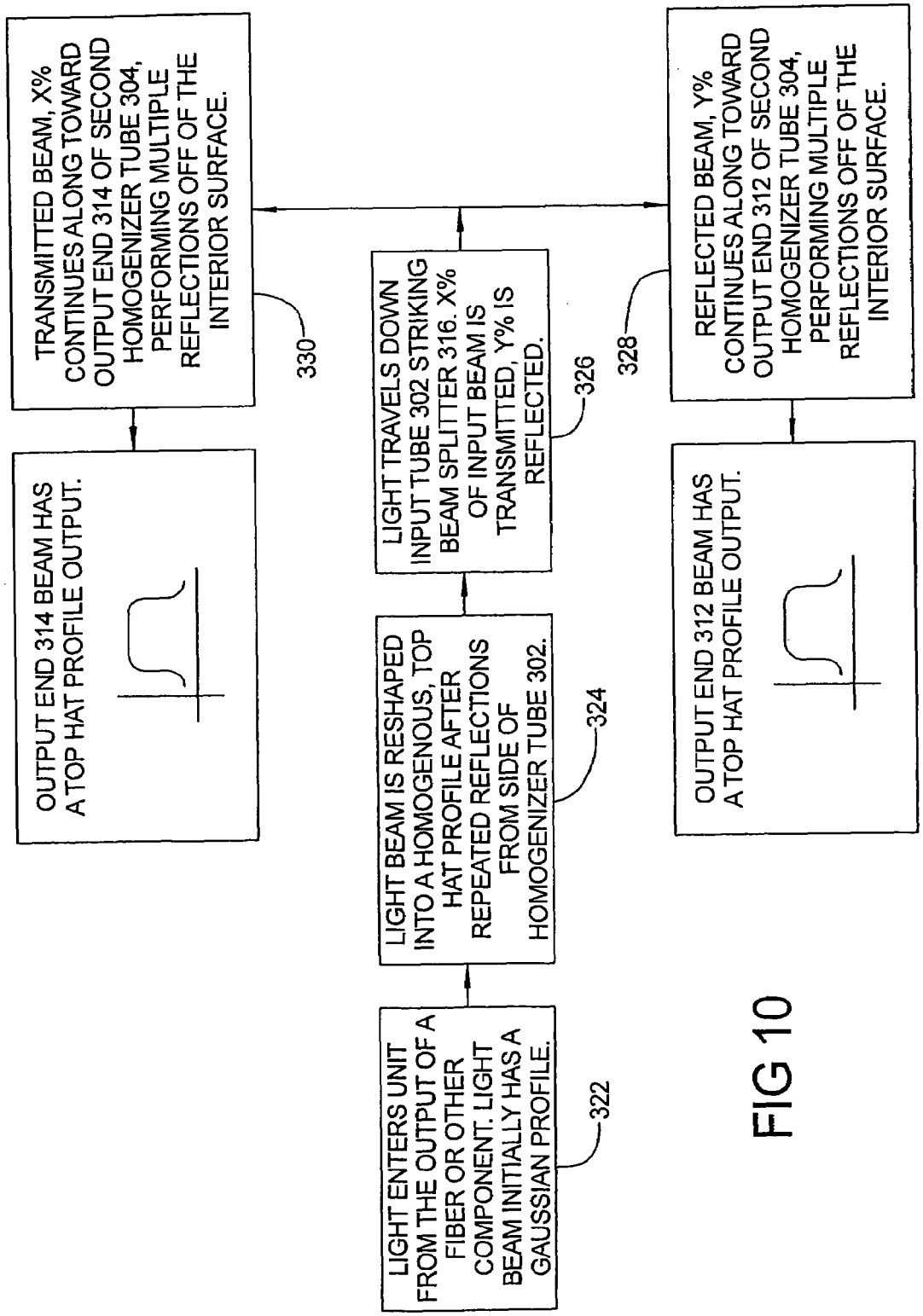
FIG. 10 is a flowchart-like diagram setting forth major operations performed by a signal splitting method of the present disclosure for generating a pair of homogenized, top-hat profile optical outputs from a single Gaussian profile optical input signal.

With reference to FIGS. 9 and 10, a description of the operation of the apparatus 300 will now be provided. Initially, a Gaussian profile optical input signal (i.e., beam) is directed into the input end 306 of the first homogenizer tube 302. The Gaussian profile optical input signal may come from the output of a fiber optic cable, a fiber optic cable bundle, or any other form of optical signal generating component or optical light guide component. At this point the shape of the Gaussian profile optical beam is actually in a "fan" pattern. The input beam strikes the highly reflective interior surfaces 318 of the first homogenizer tube 302 and is reflected repeatedly off of the interior surfaces as it moves down through the first homogenizer tube 302. As the input beam travels down the length of the first homogenizer tube 302, the beam actually "folds over" onto itself multiple times, thus beginning to form a highly homogeneous beam having a top-hat profile as it reaches the output end 308 of the first homogenizer tube 302. The input beam then impinges the beam splitter 316 where a first subquantity of the input beam is reflected towards the output end 312 of the second homogenizer tube 304, and a second subquantity of the input beam passes through the splitter 316.

Each output beam continues to be reflected repeatedly off of the highly reflective interior surface 320 of the second homogenizer tube 304 as each beam propagates towards one of the output ends 312, 314 of the second homogenizer tube 304, thus continuing to be transformed into a homogenous beam having a top-hat profile. The optical beam emitted from each output end 312, 314 forms a homogenous optical signal having a highly uniform top-hat profile, with a magnitude in accordance with the percentage of the input beam controlled by the construction of the beam splitter 316. In this example the beam splitter 316 is placed at a 45 degree angle relative to the longitudinal axis of the first homogenizer tube 302. It will be appreciated, however, that if the second homogenizer tube 304 was not positioned perpendicular to the first homogenizer tube 302, that the angle of the beam splitter 316 would need to be modified accordingly to be able to reflect optical energy along the longitudinal axis of the second homogenizer tube 304.

FIG. 10 illustrates a simplified flowchart-like diagram illustrating a plurality of operations that occur during use of the apparatus 300. At operation 322, a Gaussian profile optical input signal is received from the output of an external component (e.g., optical fiber, light guide, etc.). At operation 324, the input signal begins to be re-shaped into a homogeneous, top-hat profile beam as it propagates through the first homogenizer tube 302 towards the signal splitter 316. At operation 326, the input signal impinges the signal splitter 316, where a percentage of the input signal passes through the signal splitter 316 and a percentage is reflected by the signal splitter. At operation 328, the portion of the input signal effected by the signal splitter 316 continues propagating through the interior area of the second homogenizer tube 304, repeatedly being reflected off of the reflective interior walls 320, toward the output end 312. At operation 330, the same action occurs for the portion of the input signal that passes through the signal splitter 16, but with that portion propagating toward output end 314. During both of operations 328 and 330, the optical signal portions continue to be reflected repeatedly off of the interior walls 320 and are each refined into highly homogeneous, uniform top-hat profile output beams as they reach their respective output ends 312 or 314.

It will be appreciated that while a single second homogenizer tube 304 has been illustrated, that modifications to the apparatus could be made to provide more than two outputs, such as if two homogenizer tubes 304 were coupled at right angles to one another, and each being perpendicular to the first homogenizer tube 302. In that instance, a suitable signal splitter assembly could be incorporated to split the input Gaussian profile optical signal into four distinct outputs, each having a predetermined subquantity of the total optical energy carried by the input signal. As will be appreciated, a wide variety of modifications could be employed to provide various numbers of homogenized, top-hat profile output signals to suit the needs of a wide range of applications.

The system 300 and method of the present disclosure thus is able to combine three distinct optical processes into a single apparatus. In addition to redirecting an input beam, it is able to split the input beam into two or more distinct optical output beams. Plus, the apparatus 300 is able to convert the initial incoming Gaussian profile input beam into a highly uniform, homogenous, top-hat profile output beam. Since the apparatus 300 essentially forms a single assembly, it may be manufactured more cost effectively and more simply than many other optical systems requiring a large plurality of independent component parts to accomplish the same functions. Also, the construction of the apparatus 300 forms a rugged, yet lightweight device for splitting, redirecting and modifying an input beam having a Gaussian profile into a plurality of distinct, homogenized output beams each having a uniform, top-hat profile.

The apparatus 300 also provides the benefit of being extremely compact and relatively light in weight, and thus lends itself well to applications, such as use in commercial aircraft and other forms of mobile platforms, where reducing weight of such components is an important design consideration. Since the apparatus 300 can be made in a compact form, it is also ideally suited for those situations where an optical signal must be redirected within a small area that would not be possible to bend an optical fiber without risking breakage of the fiber. The high efficiency provided by the apparatus 300 also ensures that a great majority of optical energy carried by the input signal will be used to make up the plurality of output signals.

Figure 11:
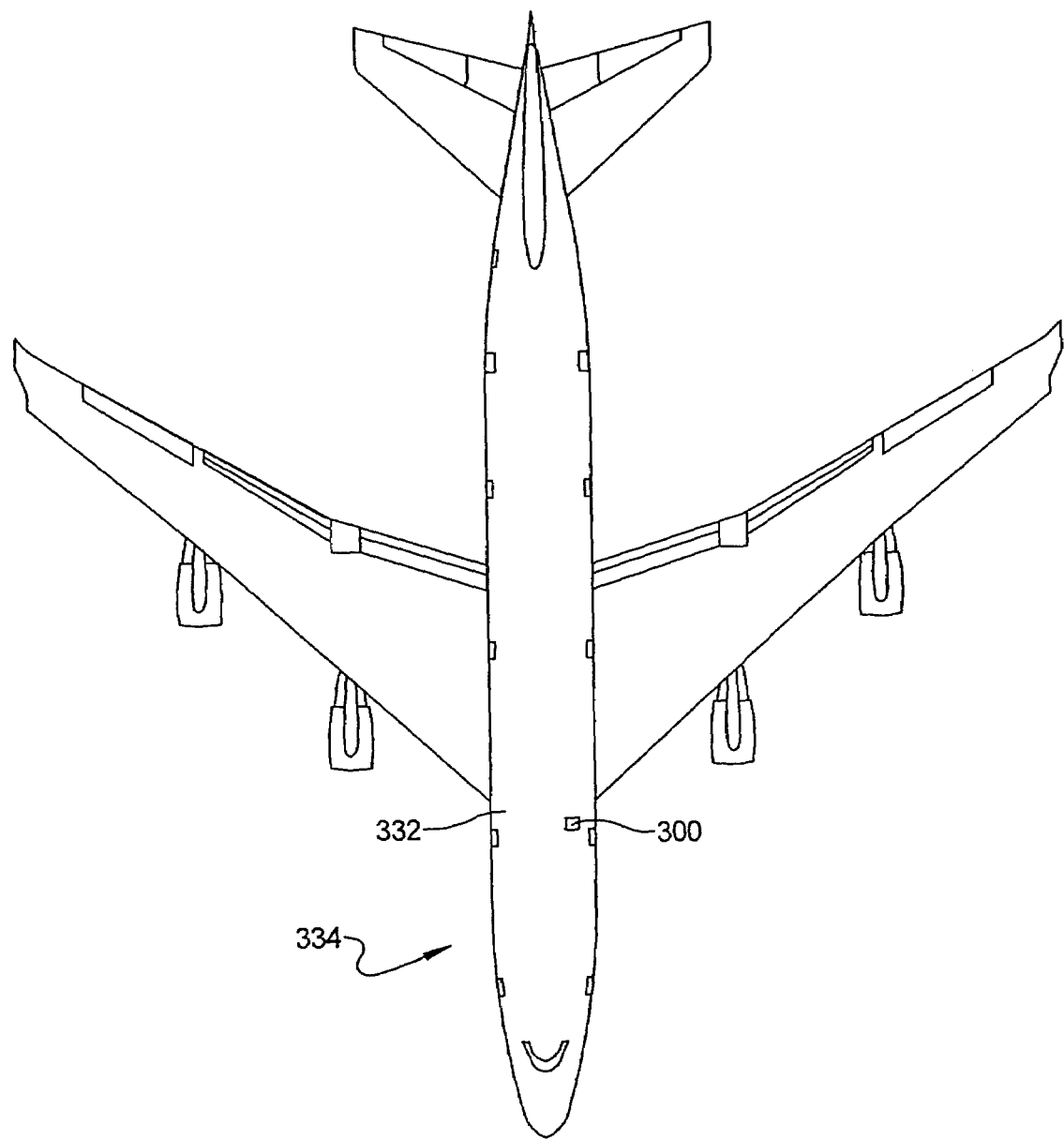
FIG. 11 is a top view of an aircraft employing the signal splitter apparatus of the present disclosure.

Referring to FIG. 11, a highly simplified representation of the apparatus 300 employed within a fuselage 332 of a commercial passenger aircraft 334. It will be appreciated that the apparatus 300, since it is extremely light in weight and compact, is ideally suited for such applications. However, the apparatus 300 could just as readily be employed in connection with any form of mobile platform, for example on rotorcraft, maritime vessels such as ships and submarines, or on land vehicles such as busses, trains or other motor vehicles, as well as on any other form of airborne or land based vehicle. The apparatus 300 is also expected to find utility in land based applications within buildings and other forms of structures, and with a wide variety of optical communication systems.

While various embodiments have been described, those skilled in the art will recognize modifications or variations which might be made without departing from the inventive concept. The foregoing examples are not intended to limit the present disclosure. Therefore, the description and claims should be interpreted liberally with only such limitation as is necessary in view of the pertinent prior art.

What is claimed is:

1. A system for splitting a Gaussian profile optical input signal into a plurality of homogenous light beam output signals, the system comprising:
   a first homogenizer tube for receiving a Gaussian profile optical input signal;
   a second homogenizer tube in communication with said first homogenizer tube, and adapted to receive said input optical signal from said first homogenizer tube; and
   a beam splitter operably associated with said second homogenizer tube for directing a desired subquantity of optical energy from said input optical signal from said first homogenizer tube to each of a pair of outputs of said second homogenizer tube to form a pair of output signals, with at least one of said pair of output signals forming a homogeneous, top-hat profile optical output signal.

2. The system of claim 1, wherein said second homogenizer tube is physically coupled to said first homogenizer tube.

3. The system of claim 1, wherein said second homogenizer tube is physically coupled to said first homogenizer tube to extend generally perpendicularly to said first homogenizer tube.

4. The system of claim 1, wherein said first homogenizer tube operates to begin to form said input signal into a homogenized top-hat profile optical signal.

5. The system of claim 1, wherein both of said outputs from said second homogenizer tube comprise top-hat profile optical output signals.

6. The system of claim 1, wherein each of said first and second homogenizer tubes has a hexagonal, cross-sectional shape.

7. The system of claim 1, wherein each of said first and second homogenizer tubes has a hexagonal, cross-sectional shape having a reflective interior wall surface.

8. The system of claim 1, wherein said beam splitter comprises a beam splitting element arranged at approximately a forty-five degree angle relative to said first homogenizer tube, said beam splitting element having a reflective portion and a transmissive portion.

9. A system for splitting a Gaussian profile optical input signal into a plurality of homogenous light beam output signals, the system comprising:
   a first homogenizer tube for receiving a Gaussian profile optical input signal and beginning to generate a top-hat profile output signal;
   a second homogenizer tube having an input in optical communication with said first homogenizer tube, and a pair of outputs;
   a beam splitter disposed within said second homogenizer tube adjacent said first homogenizer tube, said beam splitter being adapted to split said optical signal received from said first homogenizer tube into first and second top-hat profile optical signals each having a predetermined subquantity of a total optical energy provided from said first homogenizer tube; and
   said second homogenizer being adapted to direct said first and second top-hat profile optical signals each to a respective one of said pair of outputs.

10. The system of claim 9, wherein said second homogenizer tube is physically coupled to said first homogenizer tube to extend generally perpendicularly to said first homogenizer tube.

11. The system of claim 9, wherein one of said first and second homogenizer tubes has a hexagonal, cross-sectional shape.

12. The system of claim 9, wherein each of said first and second homogenizer tubes has a hexagonal, cross-sectional shape.

13. The system of claim 9, wherein each of said first and second homogenizer tubes has a hexagonal, cross-sectional shape having a reflective interior wall surface.

14. The system of claim 9, wherein said beam splitter comprises a beam splitting element arranged at approximately a forty-five degree angle relative to said first homogenizer tube, said beam splitter having a reflective portion and a transmissive portion.

15. A method for generating homogeneous, top-hat profile optical signals from a Gaussian profile optical input signal, the method comprising:
   using a first light directing component to receive and propagate a Gaussian profile optical input signal;
   using a second light directing component in communication with said first light directing component to receive said input signal;
   splitting and forming said input signal into a pair of homogeneous, top-hat profile output beams within said second light directing component; and propagating said pair of homogeneous, top-hat profile output beams to a pair of outputs of said second light directing component.

16. The method of claim 15, wherein using a first light directing component comprises using a tube having a hexagonal, cross-sectional shape and a reflective interior surface.

17. The method of claim 15, wherein using a second light directing component comprises using a tube having a hexagonal, cross-sectional shape and a reflective interior surface.

18. The method of claim 15, wherein using a second light directing component in communication with said first light directing component comprises physically coupling a second light directing component to a first light directing component such that said second light directing component extends non-parallel to said first directing component.

19. The method of claim 15, wherein splitting said first top-hat profile output beam comprises using an optical signal splitter positioned adjacent an output end of said first light directing component.

20. The method of claim 19, wherein comprising splitting and forming said input signal comprises using an optical signal splitter having a transmissive portion and a reflective portion.

* * * * *